United States Patent [19]

Hotchkiss et al.

[11] 4,449,015
[45] May 15, 1984

[54] CONNECTOR COVER WITH MULTIPLE MOUNTING MEANS

[75] Inventors: Kenneth W. Hotchkiss, Golden; John A. Popken, Longmont; Nellie S. Griffith, Boulder, all of Colo.

[73] Assignee: Proto Production Plastics, Inc., Boulder, Colo.

[21] Appl. No.: 264,649

[22] Filed: May 18, 1981

[51] Int. Cl.³ .................. H01R 13/52; H02G 3/10
[52] U.S. Cl. .................. 174/138 F; 174/65 R; 174/66; 220/266; 220/268; 339/116 C
[58] Field of Search ............... 174/65 R, 138 F, 66, 174/67; 339/36, 116 C, 208; 220/265, 266, 268

[56] References Cited

U.S. PATENT DOCUMENTS

| | | | |
|---|---|---|---|
| 1,064,033 | 6/1913 | Wagner | 220/266 |
| 2,659,765 | 11/1953 | Dunn | 174/65 R |
| 2,932,685 | 4/1960 | Raila et al. | 174/93 X |
| 3,227,304 | 1/1966 | Asbury | 220/268 |
| 3,499,102 | 3/1970 | Gillemot et al. | 174/138 F |
| 3,598,900 | 8/1971 | Drake | 174/138 F |
| 4,229,616 | 10/1980 | Hotchkiss | 174/138 F |

FOREIGN PATENT DOCUMENTS 564946  3/1958  Belgium .................. 174/65 R

*Primary Examiner*—Laramie E. Askin
*Attorney, Agent, or Firm*—Kyle W. Rost

[57] ABSTRACT

A cable connector cover for use primarily with telephone cable connectors is provided with knock-out panels for bringing a connector half into the cover from an outlet box and for creating screw openings for mounting on the outlet box. Further mounting is possible by the use of snap-in inserts fitting within diagonally arranged pockets on the rear of the cover, which inserts may magnetically or adhesively be joined to an external object. Screws for holding the cover on an outlet box are carried in a press-fit holder within the cover, and the holder is spaced above an underlying wall by a sufficient distance that tape segments for use on the inserts can be stored between the wall and screws. Further knock-out panels provide mounting for modular jacks. Adjustable cable passage openings seal around various cable sizes or may be closed by plugs. A movable contact member in each cable passage opening is provided with flexible ears that are cammed into wrapping engagement with small cables to also permit the movable member to approach very close to the terminal end of the cable opening.

23 Claims, 10 Drawing Figures

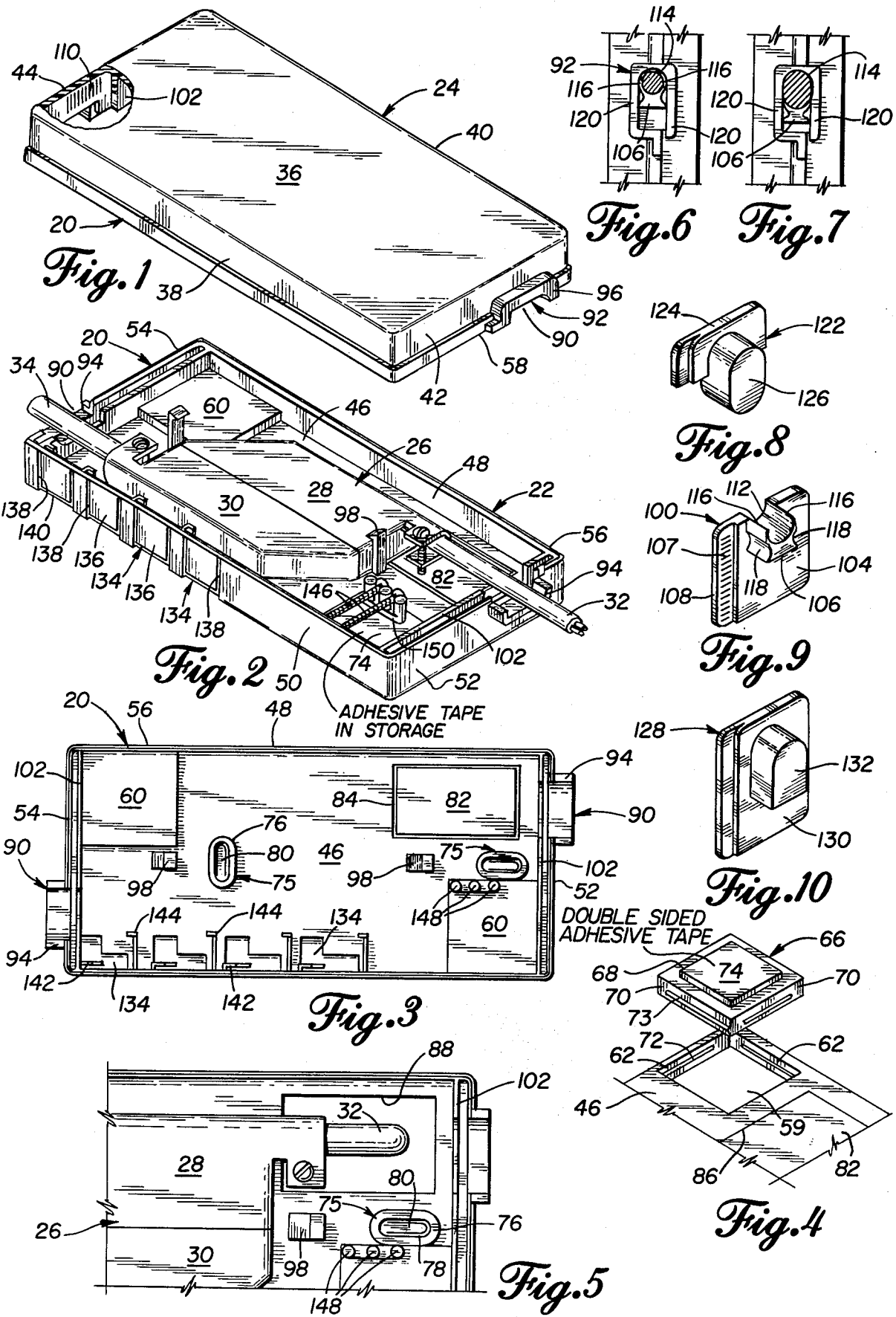

CONNECTOR COVER WITH MULTIPLE MOUNTING MEANS

BACKGROUND OF THE INVENTION

1. Field of the Invention

This invention relates generally to electricity, conductors and insulators, and more specifically to sheaths, coverings, or housings for cable connections, especially to water resistant coverings for telephone cable connectors. The invention further relates to insulators for terminal covers.

2. Description of the Prior Art

Electrical connections are often located in areas where contamination by foreign matter such as dirt or moisture can cause failure. This is especially true in the case of telephone cable connectors used in commercial multi-line telephone installations, where the connector may be located away from a wall or other traditional fastening point elevated above floor level. Thus, normal cleaning activities subject the electrical connections to dirt and water.

U.S. Pat. No. 4,229,616 discloses a connector cover that resists entry of water and dirt and is capable of sealing with reasonable snugness around cables of a variety of diameters. However, connector covers having improved sealing ability or the ability to seal a greater range of cable diameters remain desirable. The present invention provides a number of improved features over the teachings of the above noted U.S. patent.

U.S. Pat. No. 3,499,102 discloses a cable connector cover that may be anchored to furniture without defacing the furniture. In this regard also, it remains desirable to mount such covers in more positive and wear resistant manner, but with provision that the cover is capable of being pulled free under strain on the cable. Further, as a matter of practical convenience to the telephone installer, it is desirable to eliminate the need for a variety of special purpose covers and to create a single cover having versatile mounting capability. In this way, the installer may be confident that the same cover can be used whether it is to be mounted on furniture, a wall, or an electrical outlet box.

A remaining problem in the design of cable connector covers is that a substantial variety of telephone hookups are now used, and an installer or serviceman may not know until arriving at a job site which type of equipment will be encountered. The older types of cable connectors are readily accommodated by the technology taught in the above-mentioned patents. Newer modular connectors employ a substantially different technology using small jacks and plugs. Where in the older art a large cable might enter a connecter and an equally large or smaller cable might exit the connector for attachment to a telephone or plurality of telephones, the newer art anticipates that the exiting cable be replaced by modular connection jacks, whereby no hard-wired cable will be required to exit the cover. It is therefore desired to accommodate the newest concepts in telephone technology in a single connector cover that is also able to accommodate the older technology.

These and other problems of the art are resolved as described in the following explanation.

SUMMARY OF THE INVENTION

A cable connector cover of rectangular design is divided into top and bottom portions with snap-together union means at the division line, which also crosses cable passage openings at approximately diagonally opposite positions in opposite end walls of the cover. Each such opening has an arcuate edge for partially sealing around a cable. A sliding door means is carried immediately inside the cover at each end wall and has a cable contacting member extending normally to the door plate and through the opening, the contacting member having a curved seat complementary to the curved edge of the opening for completing the seal around a cable. The edges of the curved seat are sufficiently flexible that they are deflected inwardly by contact with the curved edge of the opening and may be separated by such curvature from connection to the door plate, whereby the edges may become wrapped around more than 180 degrees of the cable circumference and the contacting member may have its width sufficiently reduced that it is capable of entering the area between the edges of the opening arc for snug sealing against small diameter cables. If no cable is used in an opening, a plug fills the space between the arcuate opening edge and the cable contacting member, and a plate carrying the plug mates with the door plate. Alternatively, the sliding door is replaced with a plug the size of the opening and carried on a plate.

One portion of the cover, such as the bottom portion, is provided with a variety of mounting means. Pockets are formed in the bottom wall at diagonally opposite corners and carry snap-in inserts. Adhesive means such as double-sided tape may be mounted on the inserts for attachment of the cover to an external object, and the strength of the attachment is then regulated by the holding force of the inserts in the pockets so that the cover can be pulled free at a predetermined force. The pockets are sealed from the inside of the cover so that the protective quality of the cover is preserved. The pockets are approximately on an opposite diagonal of the rectangular cover from the cable passage openings.

A pair of screw opening panels are defined in the bottom wall by lines of weakness that preferably permit a hinge area to remain so that the panels are not fully removable from the bottom wall. The panels are located to overlie the screw attachment points of a standard electrical outlet box. A cable connector-half access panel is also defined in the bottom wall by a perimetric line of weakness, permitting the panel to be removed in order to bring a cable connector half into the cover from an outlet box. The access panel is located with respect to the screw opening panels so that it will be over the outlet box when the cover is mounted on the box, and the access panel is further approximately in a diagonal quadrant of the bottom wall adjacent to a cable passage opening.

A side wall of the cover adjacent to the bottom wall carries a jack panel adapted to be removed in order to fit a modular jack into the cover. Lines of weakness perpendicular to the bottom wall define opposite sides of the jack panel, but the lines do not cross the union means at the top of the side wall portion so that the protective quality of the cover is not degraded unless this panel is actually removed. Inside the cover, a flange wall is spaced from the panel for engaging a modular jack, and a further L-shaped rib aids in retaining the jack in the desired position until the cover can be closed to secure the jack.

The inside surface of a pocket may support press-fit screw retaining means such as a series of three spaced apart lugs capable of firmly holding electrical outlet box screws in the gap between them. The gap between the lugs may be filled immediately adjacent to the pocket wall so that the screws lie in a parallel but spaced plane from the pocket wall, creating a storage gap between the screws and pocket wall for receipt of double-sided tape segments being stored for later use on the snap-in inserts.

The main object of the invention is to provide a single cable connector cover capable of mounting a connector under any required conditions, including over an electrical outlet box, on a wall, or on furniture.

Another object is to provide a self-contained cover able to resist entry of water and dirt by snugly sealing around a wide variety of cable sizes and closing cable passage openings when they are not in use.

A further object is to provide a cable connector cover that can employ modular telephone technology.

These and other objects are achieved as more fully described below.

BIREF DESCRIPTION OF THE DRAWINGS

FIG. 1 is an isometric view of the cable connector cover lid in partial section.

FIG. 2 is an isometric view of the cable connector cover base, showing a cable connector therein.

FIG. 3 is a top plan view of the cable connector cover base.

FIG. 4 is an isometric sectional view of the back side of the base, showing a fastener and pocket.

FIG. 5 is an enlarged sectional view of the base, showing the connection of a cable from an electrical outlet box.

FIG. 6 is a sectional end view, showing the engagement of a relatively small cable in the sliding door means.

FIG. 7 is a view similar to FIG. 6, showing the engagement of a relatively large cable.

FIG. 8 is an isometric view of a plug.

FIG. 9 is an isometric view of a sliding door closure.

FIG. 10 is an isometric view of a modified plug.

DESCRIPTION OF THE PREFERRED EMBODIMENT

As shown in FIGS. 1–3, the connector cover 20 consists of two mating portions that may be designated the base 22 and lid 24. When the base and lid are united, they form a generally rectangular box-like cover that is especially adapted to contain a connector 26 of the type used to unite multi-line telephone cable. Such a connector has two halves 28 and 30 each joined to a cable 32 or 34. The wire pairs in the two cables are pre-joined to the respective connector halves, permitting many pairs of wires to be joined at the connector by plugging the halves together. A single cable and connector is able to accommodate twenty-five pairs of wires according to the present practice in the telephone industry. The connector cover 20 is desirable both as a means of mounting the connector 26 on a wall, article of furniture, or electrical box, and as a means of protecting the connector and its many wires pair connections from damage, dirt, and moisture. Although the cover 20 is resistant to the entry of foreign matter, it is not intended to be water tight. However, it is intended to withstand such common contact with water as floor washings and spilled liquids.

Lid 24 is formed with smooth surfaces and clean lines for good visual impression and easy dirt removal, since the lid is the cover portion most exposed in the typical installation. The lid therefore has a face 36 in the shape of a rectangle and a perimeter defined by normally extending side walls 38 and 40 along the longer sides of the face and end walls 42 and 44 along the shorter sides of the face. Together, the face, side walls, and end walls define a shallow box having an open side opposite from face 36.

Base 22 includes a face 46 and normal perimetric walls including opposite side walls 48 and 50 and end walls 52, 54 together defining a second shallow box having an open side opposite from face 46. The base and lid may be united by a tongue and groove snap-together union having water resistant characteristics and best described in U.S. Pat. No. 4,229,616, incorporated by reference herein. The tongue portion of the union may be formed on the edge 56 of the base 22, while the groove may be formed on edge 58 of lid 24.

A plurality of mounting means are provided for attaching the cover 20 to a suitable structure. As shown in FIGS. 3 and 4, wall 46 of the base includes inward recesses 59 at diagonally opposite corners of wall 46, each recess being closed to the inside of the cover 20 by a back wall 60 and side walls 62. A snap-in fastener 66 is adapted to fit in each recess. The fastener may be formed with an outer wall 68 and four depending side walls 70 each of the same height as the depth of the recess 59. Protruding ribs 72 on the recess side walls 62 and stepped edge 73 on fastener side walls 70 are positioned to snap past each other when the fastener is fully inserted into the recess, which then defines a snug pocket for the fastener. The fastener wall 68 forms a smooth outer surface in combination with face wall 46.

The flush squares 66 in pockets 59 provide a mounting for the cover when adhesive means such as foam plastic double back tape 74 is applied to the squares and the cover is then attached by the second side of tape 74 to the desired surface, which may be a desk, wall, or the like. Because the wall 68 is coplanar with wall 46, tape 74 is readily applied to wall 68 while the square 66 is contained in pocket 59, and the tape protrudes from walls 46 and 68 for permitting application of the cover to the desired surface. It remains possible to separate the cover from the surface by separating the fastener squares 66 from the cover. The separation may be intentional, as when the article of furniture carrying the cover is to be moved, or the separation may be accidental, as when the cables 32 or 34 become overstressed. Regardless of the cause of separation, the cover 20 retains its water resistant qualities even when fasteners 66 are removed, and the cover may be replaced on the same fasteners repeatedly without substantial loss of holding power. The snap-off action of the fasteners offers the further advantage of being specific to the requirements of a connector and cable as described, permitting the connector to be supported adequately while the cover may be disconnected under a greater load or force such as may occur under the force level likely to damage the mounting surface. Pocket 59 also provides a mounting point for a flush mounted magnetic fastener, or the square 66 may be left in place and the smooth rear face of the cover may carry a larger flat flexible magnetic sheet attached to the cover by an adhesive.

Cover 20 is also mountable over wall outlet boxes and other wall conduit systems. As best shown in FIGS. 3 and 5, base 22 has a pair of knock-out screw hole panels 75 defined in wall 46 at positions located for standard outlet box screw connections. Each screw hole panel is defined by a perimetric rib 76 following an elongated path such as an ellipse. Within the boundry defined by the rib, wall 46 is reduced in thickness and is bounded by a U-shaped groove 78 having a discontinuity at one longitudinal end of the ellipse where the surrounded wall portion 80 directly contacts the rib 76, shown at the left hand end of the panel 75 of FIG. 5. The screw hole panels 75 can be opened with the aid of a tool such as a screwdriver. Each wall portion 80 is designed to peel from one longitudinal end of the ellipse to the other, where the discontinuity in groove 78 provides a tear resistant hinge means for retaining the central wall 80 in connection with the base 22.

When the cover is being used over an outlet box, a cable passage knock-out 82 provides a means of bringing the cable and one-half of the connector into the cover from within the outlet box. Knock-out 82 is defined by a perimetric groove 84 on the inside surface of wall 46 and may additionally have a score line 86, FIG. 4, on the outside surface of wall 46. Panel 82 is sufficiently large that connector half 28 can be passed through the opening created by the removal of the panel. The entire panel 82 is located in one quadrant of wall 46 as viewed in FIGS. 3 and 5 so that the cable 32 can be brought through the opening 88 while the connector 26 is fastened inside the cover 20. Together, knock-out panels 75 and 82 permit an alternative usage of the cover 20 as a water protective covering replacing other types of shields that have been used over outlet boxes. In this way, the cover 20 eliminates the need for other types of protective coverings. To some degree, the water protective feature is reduced when the knock-out panels 75 and 82 are opened, but this loss of protection is ameliorated by the mounting location of the cover over an off-the-floor outlet box, whereby the need for water protection is reduced.

The cable connector 26 is contained in cover 20 with cables 32 and 34 exiting the cover through suitable apertures, one of which is opening 88, for example. However, when the cover is not mounted over an outlet box and the maximum degree of water protection is desired, the cables enter and exit the cover through openings 90 defined by housings 92, in turn cooperatively formed by housing portions 94 associated with the base and housing portions 96 associated with the lid. The openings 90 are in diagonally opposite positions of the opposite end walls of the cover so that the cables 32 and 34 can pass through the openings without substantial bending, and the connector 26 is held in the desired position in the cover by flexible hooks 98 attached to the base wall 46.

When the cables are directed through one or more openings 90, the excess space between the cable and the housing is closed by a sliding door 100, the general operation of which is described in the aforementioned U.S. Pat. No. 4,229,616. Such a door, shown in FIGS. 6, 7, and 9, is carried between the cover end walls and a parallel, inwardly spaced interior wall 102 at each end of the cover, with a part of interior wall 102 being associated with the base and another part being associated with the lid at each end of the cover. The sliding door includes both a closure plate 104 and a cable contact member 106. The closure plate is sized to fit between the cover end wall and interior wall for sliding motion. A series of ribs or teeth 107 is located along an edge of the plate 104 on a recessed portion 108 of the outer face of the plate, and another set of ribs or teeth 110 is formed on the inner face of the lid end walls 42 and 44, as shown in FIG. 1. Teeth 107 and 110 overlap when the sliding door 100 is placed in operative position between the end wall and interior wall of the cover and provide a locking means that prevents unauthorized movement of the door 100. Cable contact member 106 is provided with a curved seat 112 for receiving the cable when the sliding door 100 is moved toward the cable, holding the cable snugly between the seat and the curved top of the housing 92, best shown in FIGS. 6 and 7.

The sealing ability of the cable contact member has been improved so that a snug seal is obtained automatically with cables ranging in size from a four wire telephone cable to a fifty wire telephone cable, those two sizes representing the full range of cable sizes presently applied to a single connector 26. The sliding door of the prior art, taught in U.S. Pat. No. 4,229,616, was limited in its sealing ability with small cable by the fact that curved seat 112 has an established arc across the width of the housing 92, and as the cable contact member is moved increasingly closer to the top of the housing 92 as shown in FIGS. 6 and 7, the curved top 114 of the housing effectively narrows the width of the aperture 90 and prevents the contact member 106 from snugly sealing around very small cable. The previously proposed solution was to trim the sides from the contact member 106 and thereby allow this member to move even closer to the top of the housing. In the embodiment of FIGS. 6, 7 and 9, cable contact member 106 is now structured with flexible ears 116 at each side of the arc forming seat 112. The seat is undercut on each lateral side by recessed surfaces 118. When the contact member approaches the curved top 114 of the housing to seal a small cable as shown in FIG. 6, the ears are automatically deflected toward each other with curved top 114 serving as a camming means that guides the deflection according to the closeness of the contact member 106 to the curved top 114. At the intersection of surface 112 and plate 104, the ears may flex, stretch, or tear. Thus, when a small cable such as a four wire cable is sealed in housing 92, the ears 116 are guided by curved top 114 to substantially the opposite side of the cable from the majority of seat 112. With increasingly large cable sizes, the ears deflect less and may not be required to deflect at all, remaining wedged between the cable and the straight housing sides 120 as shown in FIG. 7.

Cable openings 90 can be closed to preserve the protective quality of the cover when no cable is passing through the housing 92, such as when a cable is brought into the cover through opening 88 or when, during construction, only the incoming cable and its connector half are installed. The end plug 122 of FIG. 8 provides a filler that simulates a cable. Plate 124 is engagable in the same gap as closure plate 104, and the plug portion 126 fits between sliding door seat 112 and curved housing end 114, providing a complete closure for the aperture 90 in combination with the sliding door 100. The end plug can be removed and discarded if a cable is to be placed through the associated housing 92.

An alternate end plug 128 shown in FIG. 10 combines the structure of a sliding door 104 and a plug 122 in a single unified structure having a plate 130 and plug 132. Although this structure eliminates the possibility of leaks between the plug 126 and seat 112, it requires that the door 100 be removed from its position in the cover and the door may therefore be unavailable at a later time when needed. Plug 128 is therefore of advantage primarily when the cover is used over an outlet box and will thereafter be unsuited for conversion to cables through both housings 92.

Cover 92 is adaptable to still another means of access whereby national industry standard sized jacks can be installed in the cover to receive mating plugs of modular telephone systems. FIGS. 2 and 3 best show a modular jack reception area 134 formed in wall 50 near end wall 54. Although four such reception areas are shown, other numbers of such areas may be located in wall 50 or other locations in the cover. Each jack reception area includes a knock-out panel 136 defined by parallel laterally spaced grooves 138 extending from tongue 56 to face wall 46, and the edge of wall 46 immediately below panel 136 is recessed at surface 140. The panel may be removed from base 22 by twisting action of a tool such as a plier, which wil snap the tongue 56 above the grooves and tear the side wall 50 along the grooves, finally tearing wall 50 along the bottom of the panel, immediately above the wall 46. A flange wall 142 is located inside the cover and parallel to wall 50, where the flange wall can be engaged by a suitable mating groove of a modular jack. An L-shaped rib 144 may be located on wall 46 along the opposite side of panel 136 from the flange wall. Together, wall 142 and rib 144 are capable of holding the jack in place prior to application of lid 24, which locks the jack in place when it is snapped to the base.

When only the first jack reception area 134 at the left end of FIGS. 2 and 3 is formed in wall 50, the flange wall 142 may be connected to inner end wall 102 adjacent to panel 136, and the groove 138 closest to the flange wall is designed to tear at the inside face of the inner wall 102. The additional reception areas spaced along wall 50 support the flange wall by a connecting wall segment to side wall 50.

A further feature of cover 20 is that it is self-contained with regard to the various available configurations for mounting and carrying cable. The various knock-out panels do not degrade the water protective quality of the cover until actual removal of the panels. Panels 136, for example, are bounded by a substantially undisturbed tongue 56 so that the seal between the base and lid maintains its maximum efficiency until the panel is actually removed. Loose parts such as plugs 122 or 128 can be carried within the cover and, as described above, will be used immediately if at all for most situations, such as for closing an aperture 90 during initial installations of telephone lines. Mounting squares are self-contained in pockets 59.

Cover 20 is adapted to carry tape 74 and outlet box mounting screws 146 in a secure location prior to use. The back wall 60 of pockets 59, or alternately face 46, supports screw mounting lugs 148 spaced apart sufficiently to snugly engage screws 146 and support the screws with their shanks overlapping the back wall of pocket 59. Mounting lugs 148 are in a line parallel to a pocket edge that is opposite from base wall 50 or 48 or from end wall 102 so that the screw heads can extend outside the lug row. Tape 74 is stored between the screw shanks and pocket wall 60, in a gap established by inter-lug filler wall 150, which extends above wall 60 by approximately the height of the thickness of two tape pieces.

At an installation site, the installer has the option of selecting the mounting materials that he requires. Unused materials may be left in the cover for possible future use. The initial choice may be to place one-half of a connector inside the cover and close the opposite aperture 90 with a plug 122. Later it may be determined that the cover is to be installed over an outlet box with screws 146 or on furniture with tape 74 and fastener squares 66. It may also be later determined that the connector half is to be brought into the box through knock-out panel 82 and that the exiting cable is to pass through the previously sealed aperture 90; or alternatively, the exiting cable may be joined to one or more modular jacks to be installed directly in the walls of the cover, and the outlet aperture 90 may then remain plugged. In any situation, the single cable connector cover 20 is easily adapted to the desired configuration.

A further option not previously known is to connect a modular jack and plug inside the cover and exit the cable from the plug through aperture 90, which can be closed to preserve the water resistant quality of the cover, despite the very small cable typically associated with a single plug. Thus, modular jacks can be used even without employing the jack reception area 134, due to the ability of flexible ears 116 to wrap around even two wire pair telephone cable.

While the above description has been provided by way of example, the scope of the invention is to be limited only by the following claims.

We claim:

1. An improved cable connector cover of the type having a body adapted to house a cable connector and defining a cable passage opening having an arcuate side, a sliding door means associated with the opening and having an arcuate edge opposed to the arcuate side of the opening, guide means for directing the sliding door means in a path toward the arcuate edge of the opening, and friction means for retaining the door in a given position along the path toward the arcuate edge, wherein the improvement comprises:

a cable access panel formed in a wall of the cover and having a perimetric line of weakness for guiding the separation of the cable access panel from the wall, wherein the cable access panel is of a size that the hole created in the wall by removal of the cable access panel will permit passage of at least one-half of a cable connector therethrough; at least one recessed pocket formed in an outer planar wall of said body; and a snap-in fastener means engagable in said pocket and defining an outer surface substantially coplanar with said outer wall for carrying the body by attachment to an external object.

2. The cable connector cover of claim 1, further comprising adhesive means carried on the outer surface of said fastener means for attaching the fastener means to an external object.

3. The cable connector cover of claim 2, wherein said adhesive means comprises a foam plastic double-backed tape having one face of the tape attached to the fastener means and the opposite face adapted for attachment to an external object.

4. An improved cable connector cover of the type having a body adapted to house a cable connector and being formed from at least two body portions joined at a separable union means for permitting the body to be opened for insertion of a cable and a connector, the body defining a cable passage opening having an arcuate side, the cable connector cover further having a sliding door means associated with the cable passage opening and having an arcuate edge opposed to the arcuate side of the opening, guide means for directing the sliding door means in a path toward the arcuate edge of the opening, and friction means for retaining the door in a given position along the path toward the arcuate edge, wherein the improvement comprises:

a cable access panel formed in a wall of the cover and having a perimetric line of weakness for guiding the separation of the cable access panel from the wall, wherein the cable access panel is of a size that the hole created in the wall by removal of the cable access panel will permit passage of at least one-half of a cable connector therethrough; and a substantially rectangular removable jack panel having one side defined by a portion of the separable union means at an edge of one body portion and having three sides defined by lines of weakness in said body portion, wherein the separable union means is substantially not crossed by any of said three lines of weakness, said jack panel being of a size to snugly receive a modular jack therein.

5. The cable connector cover of claim 4, further comprising a flange wall spaced inside said body and parallel to an edge of said jack panel for engaging a modular jack.

6. An improved cable connector cover of the type having a body adapted to house a cable connector and defining a cable passage opening having an arcuate side, a sliding door means associated with the opening and having an arcuate edge opposed to the arcuate side of the opening, guide means for directing the sliding door means in a path toward the arcuate edge of the opening, and friction means for retaining the door in a given position along the path toward the arcuate edge, wherein the improvement comprises:

a cable access panel formed in a wall of the cover and having a perimetric line of weakness for guiding the separation of the cable access panel from the wall, wherein the cable access panel is of a size that the hole created in the wall by removal of the cable access panel will permit passage of at least one-half of a cable connector therethrough; and press fit screw retainer means connected to an inside surface of the body for carrying outlet box attachment screws.

7. The cable connector cover of claim 6, wherein said screw retainer means comprises at least three posts spaced apart to define at least two inter-post gaps sized to snugly receive outlet box attachment screws.

8. The cable connector cover of claim 7, further comprising an inter-post filler wall partially filling said inter-post gaps adjacent to the connection of the posts to the underlying body wall for creating a retention area between said body wall and screws carried in the inter-post gaps.

9. An improved cable connector cover of the type having a body adapted to house a cable connector and defining a cable passage opening having an arcuate side, a sliding door means associated with the cable passage opening and having an arcuate edge opposed to the arcuate side of the cable passage opening, wherein the sliding door means is of the type having a plate with the arcuate edge at one end thereof and a cable contacting member extending normally to the plane of the plate from the arcuate edge and defining an arcuate seat substantially as wide as the cable passage opening, guide means for directing the sliding door means in a path toward the arcuate edge of the opening, and friction means for retaining the door in a given position along the path toward the arcuate edge, wherein the improvement comprises:

a cable access panel formed in a wall of the cover and having a perimetric line of weakness for guiding the separation of the cable access panel from the wall, wherein the cable access panel is of a size that the hole created in the wall by removal of the cable access panel will permit passage of at least one-half of a cable connector therethrough; and a flexible ear at each side of said seat, deformable under contact with the arcuate side of the cable passage opening, whereby the ears are guided to follow the curvature of the cable passage opening.

10. The cable connector cover of claim 9, wherein said cable contacting member defines a recess on each lateral side thereof below said seat for creating flexible side portions of the seat above the recesses.

11. The cable connector of claim 9, further comprising plug means for filling said cable passage opening between the curved side thereof and the curved seat of the sliding door means, wherein the plug means includes a planar plate contoured to fit closely against the plate of the plug means in end-to-end relationship.

12. An improved cable connector cover of the type having a body for containing a cable connector therein and having a cable passage opening formed therein, said opening having an arcuate side on at least one edge thereof, the body comprising separably joined together first and second body portions having a joining line dividing the cable passage opening and arcuate side thereof; sliding door means associated with the cable passage opening and having a plate with an arcuate edge substantially opposed to the arcuate side of the opening and having a cable contact member extending normally to the plate from said arcuate edge; guide means for directing the sliding door means in a path toward the arcuate edge of the opening to cover a substantial portion of the opening; and friction means for retaining the door in a given position along said path toward the arcuate edge of the opening while permitting the door to be moved normally thereto substantially in the plane of the opening when said first and second body portions are separated at said joining line; wherein the improvement comprises:

the cable contact member being formed from a flexible plastic material and having flexible ears at the lateral sides thereof normal to the plate and capable of being deflected toward each other under contact with the arcuate side of the cable passage opening.

13. The cable connector cover of claim 12, wherein said ears are joined to the plate at an intersection that is severable under force of contact with the arcuate side of the cable passage opening.

14. The cable connector cover, comprising:
(a) a generally rectangular body for containing a cable connector therein, said body being defined by top and bottom planar rectangular face walls mutually connected along opposite sides by a pair of parallel spaced apart side walls and mutually connected along opposite ends by a pair of parallel spaced apart end walls, each such end wall having defined therein a cable passage opening having a curved edge connected to substantially parallel, straight side edges at each end of the curve, said body being divided through said side walls, end walls and cable passage opening with a snap-together union means being connected to the side and end walls along the division for releasably closing the body;

(b) a sliding door means having a planar plate of predetermined maximum thickness and with an arcuate portion along one edge, said plate being carried parallel to and adjacent to an end wall of the body with the arcuate portion generally opposed to the curved end of the cable passage opening;

(c) an inside wall parallel to said end wall and spaced therefrom by approximately the maximum thickness of said planar plate for containing the plate for sliding movement parallel to the inside wall and end wall;

(d) a pair of pockets defined in said body bottom wall near opposite diagonal corners thereof, each pocket being defined by a recessed wall and a closed perimeter of side walls joined to the bottom wall;

(e) an insert sized to fit snugly within each of said pockets and having an outer wall substantially coplanar with said bottom wall when the insert is fully inserted in a pocket; and (f) attachment means connectable to said insert and to, in use, an external surface, for supporting the cover on the external surface by the attachment force between the insert and pocket.

15. The cable connector cover of claim 14, further comprising on the inside surface of one of said recessed walls a plurality of screw retaining means for carrying electrical outlet box screws in a position substantially parallel to and overlapping said recessed wall.

16. The cable connector cover of claim 15, further comprising a filler means between said screw retaining means for creating a gap between the plane of said recessed wall and the parallel plane of the carried screws; and wherein said attachment means comprises double-sided tape segments receivable in said gap for storage.

17. The cable connector cover of claim 14, further comprising a pair of screw opening panels defined in said bottom wall by at least partially perimetric lines of weakness and spaced to overlie the screw openings of, in use, an electrical outlet box.

18. The cable connector cover of claim 17, wherein said screw opening panels further comprise a hinge portion connecting each panel to said bottom wall for retaining the panel against full separation from the bottom wall when said line of weakness is severed.

19. The cable connector cover of claim 14, wherein said cable passage openings are approximately diagonally opposed in said end walls along a crossing diagonal to said pockets, and further comprising a connector half access panel defined in said bottom wall by a perimetric line of weakness, wherein said access panel is substantially within a quadrant of said bottom wall on the diagonal between said cable passage openings.

20. The cable connector cover of claim 14, further comprising a modular jack reception panel defined in a side wall portion connected to said bottom wall, wherein said jack reception panel is defined by parallel lines of weakness perpendicular to the bottom wall and exclusive of said snap-together union means.

21. The cable connector cover of claim 14, wherein said sliding door means further comprises a cable contacting member extending normally from said plate and through a cable passage opening, the arcuate edge of the plate being joined to a curved seat of the cable contacting member having an arc substantially as wide as the straight sides of said opening, wherein the sides of said arc comprise flexible ears adapted to be deflected toward each other by contact with the curved edge of said opening, whereby the curved seat is able to move at least partially within the opening area between portions of curved opening edge.

22. The cable connector cover of claim 21, further having means for closing a cable passage opening, comprising a plate member having an edge complementary to the arcuate edge of said sliding door means plate and having a plug member extending normally thereto, said plug member being of substantially the width between the opening side edges and having curved opposite edge surfaces corresponding to the arc of said curved edge and curved seat.

23. The cable connector of claim 14, further including means for closing a cable passage opening, comprising a planar plate of predetermined maximum thickness substantially the same as said sliding door means plate thickness and capable of being carried between an end wall and an associated inside wall; and a plug member extending normally to said plate and through a cable passage opening, wherein the plug member is of substantially the same shape as the cable passage opening.

* * * * *